Aug. 18, 1931. H. P. ELLIOTT Re. 18,151
STENCIL MACHINE AND STENCIL THEREFOR
Original Filed Jan. 13, 1927
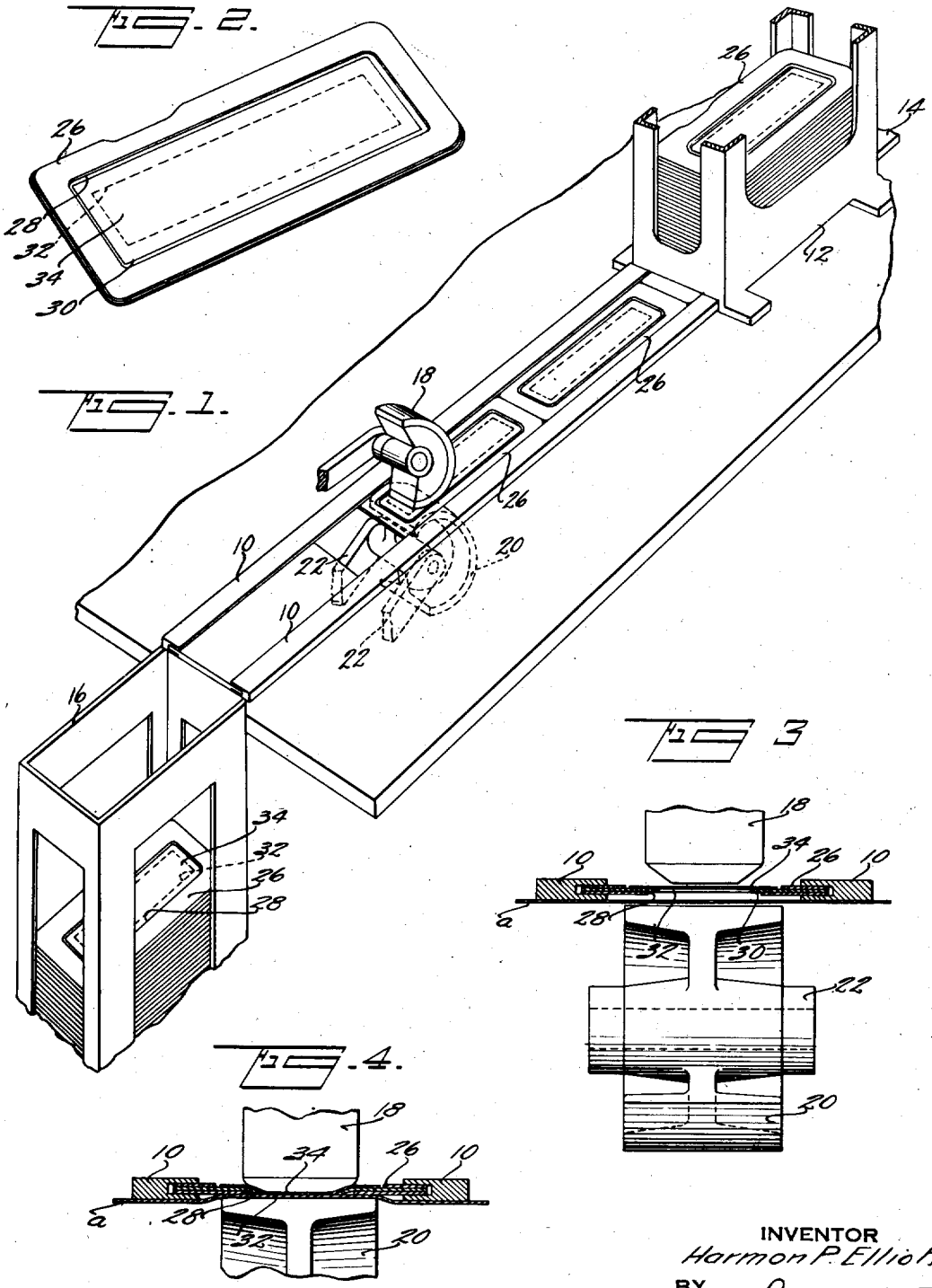
INVENTOR
Harmon P. Elliott
BY
ATTORNEY Reissued Aug. 18, 1931

Re. 18,151

UNITED STATES PATENT OFFICE

HARMON P. ELLIOTT, OF WATERTOWN, MASSACHUSETTS, ASSIGNOR TO ELLIOTT ADDRESSING MACHINE COMPANY, A CORPORATION OF MASSACHUSETTS

STENCIL MACHINE AND STENCIL THEREFOR

Original No. 1,637,443, dated August 2, 1927, Serial No. 160,871, filed January 13, 1927. Application for reissue filed July 7, 1931. Serial No. 549,301.

This invention relates to stencil printing machines and to stencils therefor.

A common type of stencil adapted for use in a stencil printing machine comprises a cardboard frame having a window therein which is occupied by a thin sheet of stencil paper that bears an address or other indicia. A common type of stencil printing machine adapted to operate upon such stencils comprises a stencil track and a pair of superposed rollers or sectors which engage the stencil and move it along the track into and out of printing position and simultaneously print therefrom. The superimposed sectors are adapted to bear against the thin stencil sheet and press the stencil into intimate contact with the envelope or other article to be printed and also to drive the stencil forwardly to effect the printing operation. Such a type of stencil printing machine and stencil have been used for a number of years and have proven very successful and form a simple apparatus for rapidly printing addresses and the like. It sometimes happens however, that the free movement of the stencil under the action of the driving rolls or sectors is impeded either because of undue friction in the track due to roughness of the stencils or from other reasons. Under such conditions an unusual and great driving force is applied to the thin stencil paper by the sectors in engagement therewith and as a consequence the stencil sheet is ruptured or is torn away from its frame so that the stencil is damaged and must be discarded.

It is an object of this invention to prevent the tearing of the stencil by providing driving rolls or sectors of such character, and a stencil to cooperate with said rolls of such character, that while the rolls or sectors serve to press the thin stencil sheet into intimate contact with the envelope as has heretofore been the case, the stencil sheet is relieved of any material driving stress and the drive is borne practically entirely by the stencil frame.

A further object of the invention is generally to improve upon stencil printing apparatus.

Fig. 1 is a perspective view of a stencil printing machine constructed in accordance with the invention, parts of the machine unnecessary for the understanding of the invention being omitted.

Fig. 2 is a perspective view of a stencil constructed in accordance with the invention.

Fig. 3 is a sectional view taken through the stencil, guides therefor and paper on which the name and address are being printed, showing the superimposed printing sectors in positions assumed just before the instant of their engagement with the stencil and with the paper, and before the stencil and paper have been flexed into contact one with the other.

Fig. 4 is a view similar to Fig. 3 but showing the manner in which the stencil sheet is pressed against the envelope while the driving force is exerted upon the stencil frame.

The stencil printing machine constructed in accordance with this invention includes a stencil track 10 along which the stencils are adapted to be moved in successive order from a superimposed pile contained in a stencil holder 12 disposed at one end of the track. A reciprocatory stencil pusher 14 is arranged to move the lowermost stencils in successive order from the stencil holder in the track 10. A stencil receiver 16 is disposed at the other end of the track and is adapted to catch the stencils as they pass from the track. A pair of superposed rotatable printing sectors 18 and 20 are disposed on opposite sides of and intermediate said track and are adapted to engage the forward end of a stencil after it has been delivered into the track from the stencil holder, and also to engage an interposed envelope or other article to be printed, and move both conjointly to effect the printing operation. The printed envelopes pass from between the sectors and fall free therefrom while the stencils pass along the track into the holder. The lower printing sector 20 has an inflexible face and is rotatably supported in a spring-pressed yielding frame 22 which permits the sector to be displaced in a vertical direction to accommodate envelopes of various thicknesses. The upper or printing sector 18 is provided with a yielding or rubber face 24 which is adapted to be constantly inked; and the two segments are adapted to be simultaneously rotated by suitable means not necessarily described.

The stencil constructed in accordance with this invention for use in the aforesaid machine is shown in perspective in Fig. 2 and in cross section in Figs. 3 and 4. The stencil comprises a relatively thick and inflexible rectangular frame 26 composed of cardboard, which frame is provided with an elongated opening or window 28 therein. The frame is also provided with a strong and relatively thin sheet 30 of paper stock which is disposed midway between the opposite flat faces of the frame and extends into the window 28 thereof on all sides for a substantial distance, thereby to provide a strong yet flexible margin for said window. Said margin is formed with a rectangular opening 32 and a sheet of thin and flexible stencil paper 34 is cemented to said sheet 30 to cover the opening 32. The stencil sheet is adapted to bear an address or other indicia and is adapted to be pressed onto the envelope as the envelope *a* of Fig. 4 in the manner indicated in this figure, thereby to permit ink from the inked surface of the upper roll to pass through the indicia and be deposited upon the surface of the envelope.

Also in accordance with this invention both sectors 18 and 20 are adapted to exert a driving force on the frame 26 of the stencil to exclude the thin stencil sheet from the drive. To this end the lower sector 20 has a width greater than the width of the window 28 in the stencil so that the sector overlies the window on both sides thereof and thus is caused to exert its driving force upon the strong margin of the stencil rather than upon the thin stencil sheet. The upper sector 18 has a width greater than the opening 32 in the margin sheet 30 and is adapted to overlie the opening on both sides and to bear upon the margin sheet and to impress its driving force thereon thereby to preserve the thin stencil sheet free from driving stresses.

The sides of the sector 18 are adapted to be inset from the sides of the window 28 in the stencil frame so that there is a substantial extent of the marginal sheet 30 free from contact with the sector that can flex or be moved downwardly to permit the stencil sheet to be pressed into intimate contact with the envelope *a* as illustrated in Fig. 4.

The side or driving edges of the yielding face 24 of the upper sector are adapted to be compressed more than the intermediate portion of the face, which is in direct contact with the stencil sheet, thus causing the side edges to bear the strongest and thus exert the main driving force upon the marginal sheet 30 rather than upon the thin stencil sheet.

The stencil track 10 is adapted to hold the stencils in the aforesaid relation so that the sectors are caused to exert their driving force at all times on the stencil frame rather than upon the thin stencil sheet. This arrangement, while simple, prevents the rupture of the thin stencil sheet that frequently occurs with the usual driving sectors which were so arranged that they engaged the thin stencil sheet only, in spite of careful operation and adjustment of the stencil printing machine.

I claim:

1. The combination of a stencil having a strong frame provided with a window therein and a sheet of thin stencil paper attached to the frame over the window, a pair of superposed sectors adapted to drive the stencil between them, said sectors characterized by each having a width greater than the width of the window in the stencil frame, and means for guiding the stencil in its movement between the sectors in such a manner that the sectors exert a driving pressure upon the strong frame of the stencil and maintain the thin stencil paper free from the driving force.

2. The combination of a stencil having a strong frame provided with a window therein, a strong and thin flexible sheet connected with the frame and extended into the window midway between the opposite faces of the frame and providing a continuous flexible margin for the window, a sheet of stencil paper attached to said flexible margin, and a pair of superposed driving sectors adapted to drive the stencils between them, one of said sectors characterized by having a width greater than the width of said window and adapted to overlap the window on opposite sides thereof and underlie the opposite sides of the frame, and said upper sector characterized by having a width sufficiently great to overlie and bear upon the opposite sides of the flexible margin of said window whereby to exert its driving force upon said flexible margin and the width being less than the width of the window whereby to provide an unengaged portion of the margin that is adapted to flex downwardly.

3. The combination of a stencil having a stiff frame provided with a window therein, a thin sheet of stencil paper attached to said frame and disposed within the window approximately midway between the opposite faces of said frame, and superposed driving sectors adapted to engage and drive the stencil between them each characterized by having a width adapting them to overlie said window and exert a driving force on the stencil frame on opposite sides of said window and to be free from substantial driving engagement with said stencil sheet.

4. The combination of a stencil having a strong inflexible frame provided with a window therein, a thin flexible stencil sheet attached to said frame over the window, and superposed driving sectors for said stencils and adapted to engage and drive the stencil between them and characterized by each having a width greater than the width of said window and overlying and exerting a driving force on the frame only of said stencil and preserving said thin stencil sheet free from any substantial driving force.

5. The combination of a stencil having a strong inflexible frame provided with a window therein, a thin flexible stencil sheet attached to said frame over the window, and superposed driving and printing sectors for said stencils and adapted to engage and drive the stencil between them, said sectors characterized by each having a width greater than the width of said window and overlying and exerting a driving force on the frame only of said stencil and preserving said thin stencil sheet free from any substantial driving force, one of said sectors further characterized by having a yielding face adapted to flex said flexible stencil sheet into said window while maintaining driving engagement with the stencil frame.

6. The combination of a stencil having a strong inflexible rectangular frame provided with a window therein, a relatively thin, strong and flexible sheet connected with the frame and extended into the window midway between the opposite faces of the frame, said sheet having an opening therein and providing a continuous flexible margin for the opening, a thin sheet of stencil paper secured to said margin over the opening and a pair of superposed driving sectors adapted to engage and drive the stencil between them, said lower sector characterized by having an unyielding face which overlaps the stencil window on both sides thereof and said upper sector characterized by having a yielding face which overlaps the aforesaid opening and has a width less than the width of said window and is adapted to bear upon said margin sheet on opposite sides of said opening and exert a driving force mainly thereupon to flex said stencil sheet and flexible margin downwardly toward said lower sector while preserving said stencil sheet free from any substantial driving force.

In testimony whereof I have signed my name to this specification.

HARMON P. ELLIOTT.